C. A. PARSONS, A. Q. CARNEGIE & S. S. COOK.
GEAR CUTTING MACHINE.
APPLICATION FILED MAY 1, 1916.

1,209,197.

Patented Dec. 19, 1916.

Witnesses:

Inventors:
Charles A. Parsons,
Alfred Q. Carnegie &
Stanley S. Cook,
Attorneys.

UNITED STATES PATENT OFFICE.

CHARLES ALGERNON PARSONS AND ALFRED QUINTIN CARNEGIE, OF NEWCASTLE-UPON-TYNE, AND STANLEY SMITH COOK, OF WALLSEND, ENGLAND; SAID CARNEGIE AND SAID COOK ASSIGNORS TO SAID PARSONS.

GEAR-CUTTING MACHINE.

1,209,197.   Specification of Letters Patent.   Patented Dec. 19, 1916.

Original application filed February 27, 1914, Serial No. 821,500. Divided and this application filed May 1, 1916. Serial No. 94,843.

*To all whom it may concern:*

Be it known that we, CHARLES ALGERNON PARSONS, K. C. B., of Heaton Works, Newcastle-upon-Tyne, Northumberland, ALFRED QUINTIN CARNEGIE, residing at Heaton Works, Newcastle-upon-Tyne, in the county of Northumberland, and STANLEY SMITH COOK, residing at Turbinia Works, Wallsend-on-Tyne, in the county of Northumberland, England, subjects of the King of Great Britain and Ireland, have invented certain new and useful Improvements in Gear-Cutting Machines, of which the following is a specification.

This invention relates to the means for cutting the teeth in gear wheels such as are described in application Serial Number 821,500 filed February 27th, 1914.

Figure 1:
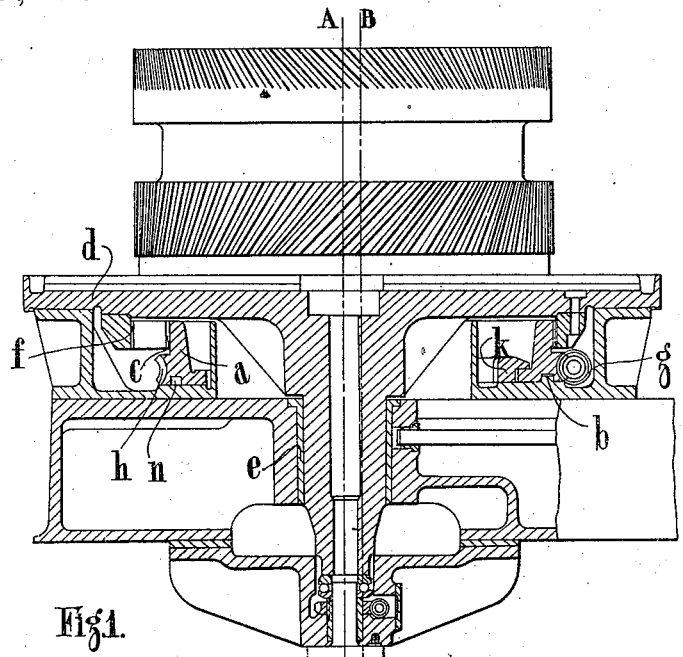
Figure 2:
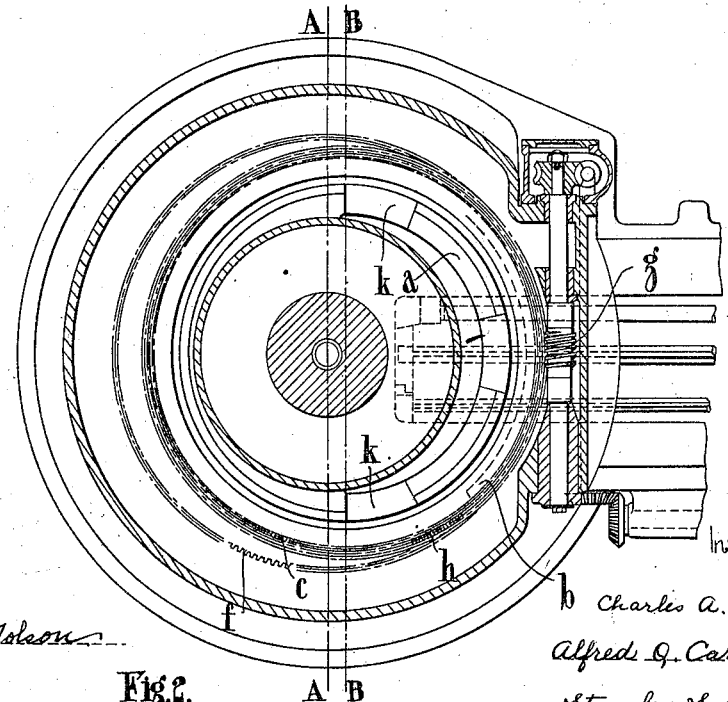

Referring to the accompanying drawings: Figure 1 is a part sectional elevation of a gear cutting machine embodying the present invention. Fig. 2 is a part sectional plan of Fig. 1.

In carrying the invention into effect according to the present construction, the driving or indexing wheel which may take the form of a ring element $a$ carries external teeth $c$ adapted to engage internal teeth $f$ carried by the work table $d$. The element $a$ is constrained to move about its axis B B by means of a projection $b$ which engages a groove $n$ in the element $a$ and is further constrained by the dogs $k$.

It will be observed that the axis B B about which the element $a$ rotates is non-coincident with the axis A A about which the work table $d$ rotates. The element $a$ carries indexing worm teeth $h$ which are engaged by the driving worm $g$. The pitch circle of the teeth $c$ is of slightly smaller diameter than the pitch circle of the teeth $f$.

It will be noticed that as the teeth $f$ and $c$ engage over a considerable arc, the motion imparted by the teeth $c$ to the teeth $f$ depends upon the average accuracy of a number of teeth instead of depending upon the accuracy of one or two teeth.

It will be understood that although the element $a$ has been described as a ring member, it may in some cases take the form of a more or less solid wheel element. When formed as a ring, however, it is desirable that the teeth $f$ and $c$ should be arranged to engage at a point near the engagement of the parent gears $g$ and $h$.

It will be seen that owing to the rotary motion imparted by the element $a$ to the table $d$, being at a slightly different angular speed from that of the element $a$, a suitable shift of phase of the work table in relation to the driven member $h$ of the parent or indexing gear in successive revolutions of the work table is obtained.

Having now described our invention, what we claim as new and desire to secure by Letters Patent is:—

1. In combination in a gear cutting machine, a work table, a ring element, means acting to constrain said element to rotate about an axis non-coincident with the axis of rotation of said table, teeth upon said ring, driving means engaging said teeth, externally projecting teeth upon said ring, teeth upon said table co-acting with said ring teeth to transmit rotary motion to said table, said co-acting teeth having different pitch circle diameters.

2. In combination in a gear cutting machine a work table, a circular element adapted to rotate about an axis non-coincident with the axis of rotation of said table, means to rotate said element, externally projecting teeth upon said element, internally projecting teeth upon said table, said external and internal teeth coacting to rotate said table at a different rate from said element.

3. In combination in a gear cutting machine a work carrying member, a circular element, means acting to constrain said element to rotate about an axis non-coincident with the axis of rotation of said member, said means comprising a groove in said element coacting with a projection upon the bed of the machine, teeth upon the periphery of said element, a driving worm engaging said teeth, externally projecting teeth upon said element, internally projecting teeth upon said member, said external and internal teeth coacting to rotate said member at a different rate from said element.

In testimony whereof, we have affixed our signatures.

CHARLES ALGERNON PARSONS.
ALFRED QUINTIN CARNEGIE.
STANLEY SMITH COOK.